United States Patent [19]

Genzling

[11] 4,071,892
[45] Jan. 31, 1978

[54] BICYCLE AND INFORMATION-PRODUCING ASSEMBLY CARRIED THEREBY

[76] Inventor: Claude Genzling, 15 Avenue des Cedres, 92410 Ville d'Avray, France

[21] Appl. No.: 678,488

[22] Filed: Apr. 20, 1976

[30] Foreign Application Priority Data

Apr. 21, 1975 France .................. 75 12337

[51] Int. Cl.² .................. G01P 3/42; G06F 15/02
[52] U.S. Cl. .................. 364/424; 235/92 T; 364/561; 364/565
[58] Field of Search .......... 235/151.3, 151.32, 92 T, 235/92 MT, 150.2, 95 R, 150.27; 324/160, 161, 181; 340/172.5

[56] References Cited

U.S. PATENT DOCUMENTS

| 3,530,382 | 9/1970 | Liston et al. ............ 235/92 T X |
| 3,656,060 | 4/1972 | Bauernfeind et al. ...... 235/92 T X |
| 3,681,752 | 8/1972 | Cuddihy ................ 235/150.2 X |
| 3,708,750 | 1/1973 | Bucks et al. ............ 235/92 T X |
| 3,748,580 | 7/1973 | Stevens et al. .......... 235/92 T X |
| 3,820,712 | 6/1974 | Oswald ................. 235/151.32 |
| 3,946,213 | 3/1976 | Kepper ................. 235/151.32 |
| 3,980,868 | 9/1976 | Thompson .............. 235/150.2 X |
| 3,983,378 | 9/1976 | Tammi .................. 235/151.32 |

OTHER PUBLICATIONS

Bicycle Tachometer/Speedometer; T. S. Mereness; IBM Technical Disclosure Bulletin, vol. 17, No. 9, Feb. 1975; pp. 2570-2571.

Primary Examiner—Edward J. Wise
Attorney, Agent, or Firm—Steinberg & Blake

[57] ABSTRACT

The combination of a bicycle with an information-producing assembly carried thereby. A structure which is carried by one of the bicycle wheels for rotation therewith turns at each wheel revolution past a second structure which responds to provide a revolution signal, this second structure being connected with a computer which receives the revolution signals as well as timed signals at a given constant frequency. The computer includes logic and arithmetic circuits for carrying out operations such as conditioning, calculating, treating, and memorizing operations, so as to produce from the revolution signals and timed signals measurements such as a lasting measurement of the total distance traveled during operation of the bicycle and ultimately of the time which has elapsed, as well as selectively producing in connection with travel over part of a given course values such as the distance traveled or time elapsed, average or maximum speed during travel along part of the course, and also instantaneous speed at any given moment. An indicating structure is accessible to the operator for selectively indicating from the computer values such as the distance or elapsed time in connection with part of the course which is to be traveled, and also for producing a temporary display, which may be illuminated, of any one of the latter values. A source of electrical energy is connected with the above structure for assuring operation thereof at least while the bicycle is used.

11 Claims, 4 Drawing Figures

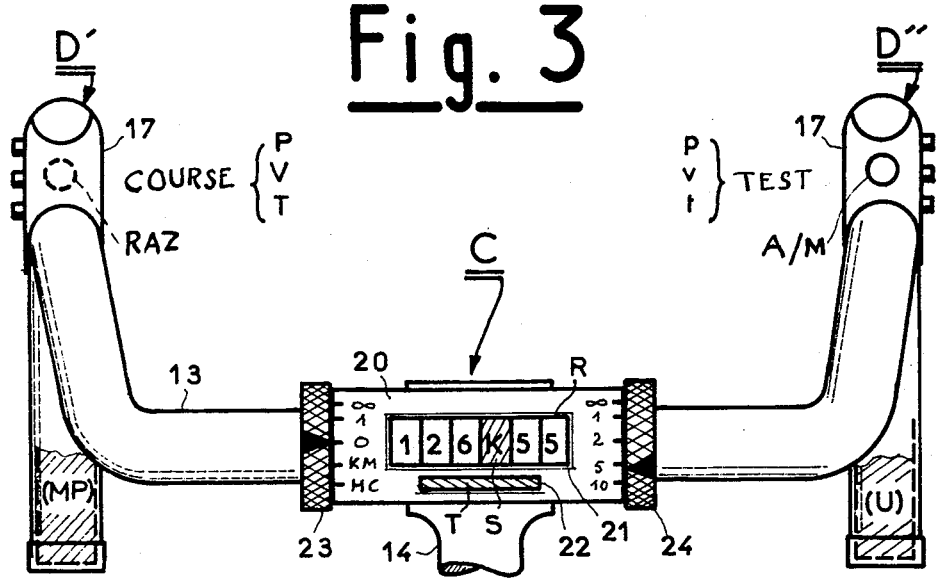
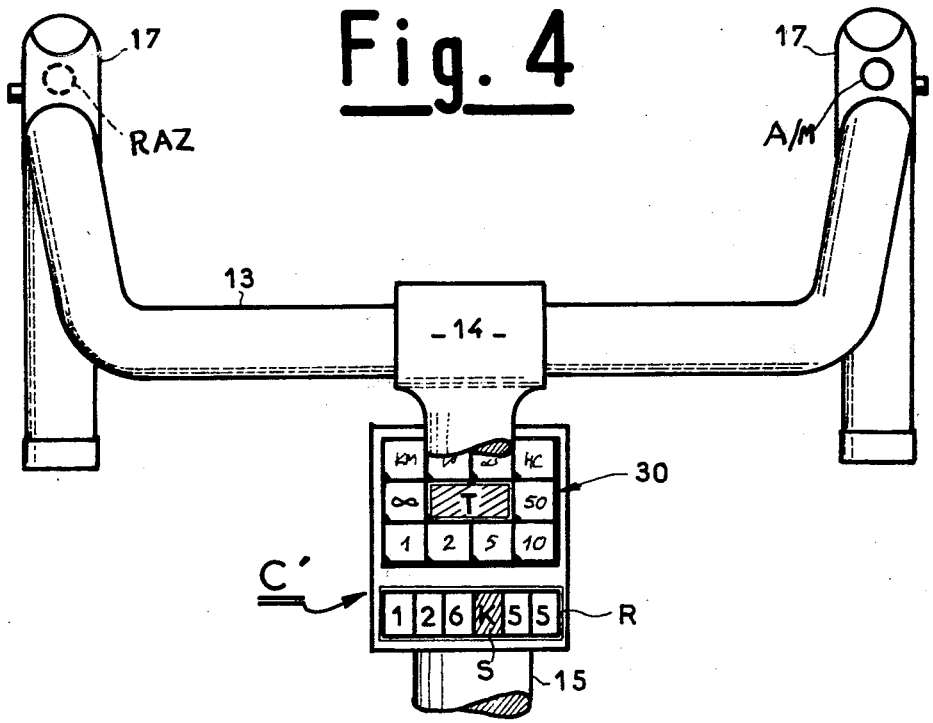

BICYCLE AND INFORMATION-PRODUCING ASSEMBLY CARRIED THEREBY

BACKGROUND OF THE INVENTION

The present invention relates to bicycles and in particular to information-producing assemblies which are combined with bicycles for giving desired information to the bicycle operator.

The invention relates in general to devices for measuring distances or routes, time and speed rates, and in particular to computer-tachymeter devices for bicycles.

Such computer-tachymeter devices are of course known and are generally utilized on different types of vehicles such as automobiles, motorcycles, and even bicycles, for the purpose of measuring and displaying on the one hand the total or partial distance traveled and on the other hand the speed which has been attained, so as to permit in this way the operation of the vehicle to be observed and the vehicle to be maintained properly.

In connection with bicycles, these known devices, generally of a mechanical nature, have certain disadvantages such as the necessity of connecting these devices to the moving parts in a manner which is prejudicial to the effectiveness of their operation and the maintenance of the moving parts in the best possible operating condition, to such an extent that racing bicycles are not provided with such equipment, with the added disadvantage that the information which is provided while being of a certain utility nevertheless is with respect to its numbers and precision insufficient to be capable of providing an immediate indication of the performance of the operator and the extent of lasting exertion required of the operator to achieve a good result or at least to improve a preliminary schedule of operation.

Of course, in this latter regard it would be highly desirable to provide, in addition to primary information pertaining to the course which has been traveled and the speed which has been attained, information pertaining to the distance and/or duration required to travel part of the course, with this additional information being selected at the will of the operator, and above all it would be highly desirable to be able to provide information pertaining to the average speed of travel along the course. However, up to the present time, such information can only be provided under very special conditions and at different times on a specially measured course such as a race track or other closed circuit of travel with the aid of qualified time keepers. Moreover, even under such highly favorable conditions, the development of the performance can only be established by repeating the trial runs, and therefore without any assurance of the same exterior conditions such as, for example, the same temperature, wind, and rain, with the unavoidable interference of fatigue and effort put out by the cyclist.

SUMMARY OF THE INVENTION

It is accordingly a primary object of the present invention to provide a structure which will alleviate the above inconveniences by providing a computer-tachymeter type of device based on a new concept and advantageously capable of being mounted without any particular problems on a bicycle while being capable of providing during actual operation, as during a race itself, as well as with the required precision all of the desired numerical information.

In particular, it is an object of the present invention to provide a device of this type which can be combined with a bicycle in such a way that it is not required to connect the computer-tachymeter device to the driving components or other moving components of the bicycle in order to be able to set the computer-tachymeter device into operation.

Thus, it is an object of the present invention to provide a device of this type which can be placed at the disposition of the operator without requiring any exterior intervention of any type by the operator while making available all types of numerical information required to permit the operator to evaluate his performance during the actual time that the performance is being carried out.

Also it is an object of the present invention to provide a device which is capable of establishing or controlling, during an actual course of action, such as during a race itself, and without any disturbing influence, schedules for the particular route which is to be taken as required by racers, sport cyclists, and touring cyclists, with such schedules being set up either in advance of their required use or subsequent to a previous operation, from distinct measurements of time and distance and with relatively complex calculations.

In accordance with the invention, the combination of the bicycle with the information-producing assembly includes at least a passive wheel-mounted means situated at a predetermined part of the periphery of one of the wheels of the bicycle for locally generating a signal or modifying a field or identifiable radiation, with a least a pick-up means being selectively sensible to these variations in the field or radiation, this latter pick-up means being carried by the frame of the bicycle or by the fork thereof with the passive means rotating past the pick-up means so that at each revolution of the wheel-mounted means with the wheel which carries the same there will be generated an electrical signal in the form of a pulse providing a given revolution signal at each revolution of the wheel which carries the wheel-mounted passive means. A computer is connected with the pick-up means to receive the revolution signals therefrom, this computer being provided with circuits for conditioning, calculating, treating and memorizing so as to produce, from the revolution signals as well as from timed signals derived from a source which may form part of the computer itself and which provides timed signals at a given frequency, on the one hand a lasting value of the total distance traveled and ultimately of the time utilized, and on the other hand at the selection of the operator values in connection with part of the course which has been traveled such as distance and/or duration, as well as information such as average and/or maximum speed effected during travel along such a partial course, and also being capable of providing a value according to the speed which has been attained at any given instant. To the computer there is connected an indicating means which is selectively and manually operable so as to provide the operator with the possibility of selecting the length or duration of a part of the course about which information is desired, while on the other hand giving the operator the possibility of temporarily displaying the results of these calculations in the form of illuminated indications of any one of the above values. A source of electrical energy is provided in order to assure a supply of power at least during use of the bicycle.

In addition, the computer and source of timed signals at a given frequency can be profitably utilized for the purpose of providing, by the simple addition of pick-ups and necessary controls making use of available calculating means, other useful information, pertaining in particular to the rate at which the pedals are operated and to the heart rate of the cyclist.

Thus, it is possible with the invention to take advantage of the flexibility of the concepts and uses of modern electronic circuits such as those which require little energy for the purpose of joining with a bicycle, without detracting from the optimum utilization thereof, the equipment which is capable of providing, during the actual time when it is most desirable, information which will have the precision and details which are desired.

BRIEF DESCRIPTION OF DRAWINGS

The invention is illustrated by way of example in the accompanying drawings which form part of this application and in which:

FIG. 3 is a schematic representation of one possible manner of arranging the parts of the device of the invention which are accessible to the operator; and FIG. 4 illustrates another embodiment of the arrangement of those parts which are accessible to the operator.

DESCRIPTION OF PREFERRED EMBODIMENTS

Figure 1:
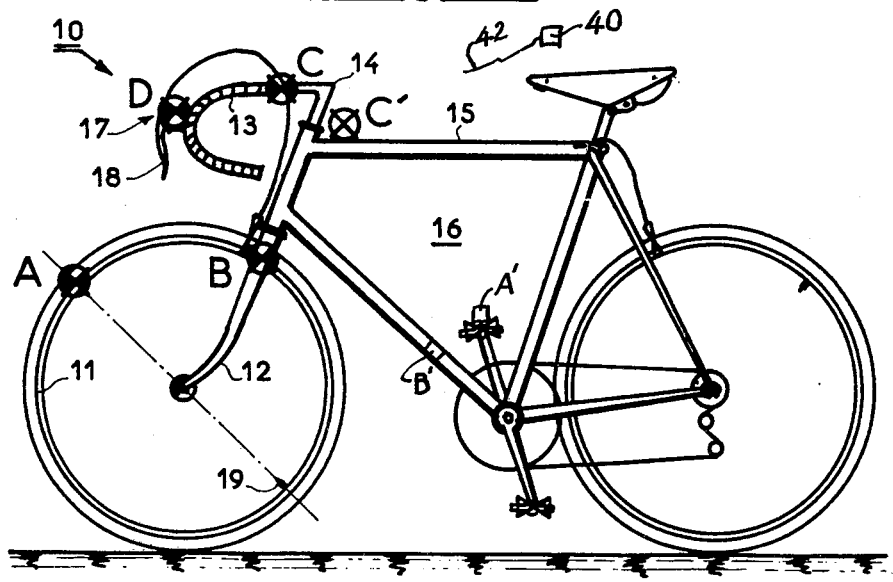
FIG. 1 is a schematic elevation of a bicycle combined with an information-producing assembly according to the invention, with FIG. 1 showing in particular where various parts of the information-producing assembly are mounted on the bicycle.

Referring to FIG. 1, there is schematically illustrated therein in a side elevation a racing bicycle 10, FIG. 1 illustrating in particular where various subassemblies of the computer-tachymeter device are united with and located on the bicycle in accordance with the invention.

The structure of the invention includes a pair of means which cooperate with each other for producing electrical revolution signals in the form of electrical pulses.

This pair of means includes one means which is carried by one of the bicycle wheels, this being the front wheel shown at the left in FIG. 1. Thus, in the illustrated example, this one wheel-mounted means which forms a passive element is illustrated as a magnet A carried by the periphery or rim of the front wheel 11, more particularly at the inside of the rim of the wheel 11. The other of the above pair of means is in the form of a pick-up means B which responds to turning of the passive means A past the means B in order to produce a revolution signal. This pick-up means can take the form of an electrical switch capable of responding to movement of the means A past the means B. Thus, such an electrical switch forming the means B can have a flexible switch-operating blade which is actuated by the magnet A each time the latter turns past such a switch so as to produce in this way an electrical pulse for each revolution of the wheel 11. However, it is also possible for the means B to take the form of an induction coil situated, as illustrated, at a part of the bicycle such as at the head of the fork 12 thereof. The pair of means A, B will thus provide revolution signals the number of which will correspond to the revolutions of the wheel 11, and these signals are transmitted to a computer means described below in connection with FIG. 2. The information which is put out by the computer means can be selected and displayed by way of an assembly for controlling the information which is to be put out and for displaying this information, this assembly being, for example, the assembly C shown in FIG. 1 mounted on the handlebar 13 at the region of the stem 14 which supports the handlebar 13. Instead of situating the selecting and displaying assembly C at the handlebar 13 in the region of its stem 14, it is possible to situate the assembly for selecting information and displaying the same at another location such as that illustrated for the assembly C' which is shown mounted on the forward part of the upper traverse bar 15 of the frame 16 of the bicycle. Moreover, the structure includes manually operable release organs D situated at the brackets 17 on which are pivotally mounted the handles 18 for operating the brakes, these handles 18 and the brackets 17 of course being carried by the handlebar 13 at the left and right forward portions thereof.

In the illustrated example the passive element A is preferably in the form of a horseshoe magnet connected the inner side of the rim of the wheel 11, and preferably as illustrated at a location which is diametrically opposed to the valve 19 of the tube of the tire or the tubeless tire itself, this valve 19 of course also being mounted on the rim of the wheel. In this way the location of the magnet A with respect to the valve 19 will contribute toward balancing of the wheel. However, it is of course possible to form the passive means A which rotates with the wheel as part of the valve 19 itself or as a part of a spoke of the wheel, making such a part of a magnetizable material in this case, or it is even possible to provide the passive means A by incorporating a quantity of magnetic powder into a suitable portion of the pneumatic tube of the tire or into a suitable portion of the tubeless tire. Thus, the wheel-mounted means A can be of any type and have any action other than a magnetic action, such as an optical or electrostatic action, with the only requirement being that it is capable of generating or locally modifying a field or identifiable source of radiation under all of the states and conditions encountered during use of the bicycle.

As has been indicated above, the pick-up means B can be formed, in the case where the means A is magnetic, by a switch having a flexible blade or a simple induction coil, or the means B can take the form of any other magnetoelectric transducer, such as a Hall detector. The means B thus can of course be constituted by a photoelectric cell or other sensitive means adapted to the particular properties of the means A. In all cases the means B must be capable of producing an electrical signal in the form of a suitable pulse each time the means A turns past the means B, with the signal which is produced being of such a nature that it can be effectively utilized in the computer to produce the desired information.

Figure 2:
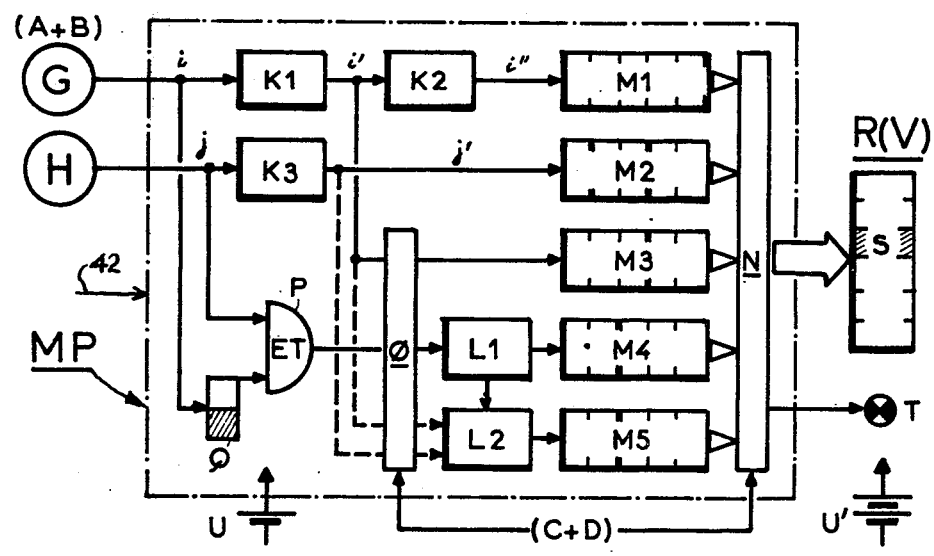
FIG. 2 is a schematic block diagram of one possible embodiment of a computer incorporated into the device and constructed according to the invention.

The control and display assemblies C or C' can receive their inputs from an electronic computer apparatus, which may in fact form parts of the assemblies C or C' or which may form a separate component suitably mounted at a part of the bicycle and connected electrically with the units C or C'. One possible example of an electronic computer apparatus according to the invention is illustrated in FIG. 2 and described below. The computer is provided with components permitting the operator to select the nature, length and/or duration of the measurements which are to be made, with the assemblies C or C' also having controls for the operator in order to be able to display the results of the measurement, and the latter features are described below in detail in connection with FIGS. 3 and 4.

Finally, the structure includes release components D used primarily for starting or stopping the operations in connection with carrying out a given measurement and displaying the result thereof.

Referring now to FIG. 2, the functional block diagram illustrates one possible embodiment of an electronic computer apparatus according to the invention. This apparatus is formed primarily by the mini-computer MP, formed in practice by way of a suitable board carrying integrated circuits at a scale large enough to assure the possibility of a large number of logic, arithmetic, and memorizing functions. These integrated circuits may be RCA complementary metal-oxide-semiconductor, integrated circuits, commonly known as COS/MOS, as described in RCA 1975 Databook SSD-203C. The computer means MP receives the revolution signals G, formed by the combination of the pair of means A and B described above, so that in this way the means G formed by the combination of means A and means B will feed to the computer at least one pulse $i$ for each revolution of the wheel 11. In addition, the computer means MP receives an input in the form of timed signals of a given frequency, these timed signals being derived from a suitable source H of electrical pulses at a given fixed frequency. For example the means H may take the form of a suitable oscillator which will provide a series of electrical pulses at a given frequency, this means H being situated either at the exterior of the computer means MP or forming an internal part thereof and producing the timed signals $j$ in the form of electrical pulses at a given constant frequency which is at least on the order of kilohertz. The oscillator H may take the form of a crystal oscillator circuit ICAN-6086 of the above RCA Databook.

The computer means MP includes a first circuit divider K1 which produces a pulse $i'$ corresponding to a unit of a given fundamental length such as, for example, a decameter. Thus, the frequency divider K1 will produce from the series of revolution pulses $i$ a single pulse $i'$ each time the wheel 11 turns through a number of revolutions required for the wheel 11 to travel through a distance of a decameter in this particular example. A second frequency divider K2 receives the input in the form of the signal $i'$, and produces therefrom a further signal $i''$ in the form of an electrical pulse determined in accordance with another unit of distance such as, for example, a hectometer or a kilometer, and this latter signal is transmitted to the first memory circuit means M1 which thus is capable of registering a measure of the total distance traveled by the bicycle, with this latter distance being capable of expression, for example, to five decimal places in kilometers or hectometers. Moreover, and if necessary, an electro-mechanical totalizer can be associated with this circuit in order to assure retaining the measured value in the event that there is an interruption in the supply of energy. The frequency dividers may be in the form of binary counters having any suitable member of stages such as the RCA CD4020AE integrated circuit.

The computer means MP further includes a second memory circuit M2 receiving its input in the form of pulses $j'$ derived from a frequency divider K3 connected with the timed signal-producing means H. The memory means M2 receives at least one impulse each second and contains at any given instant a measure of the elapsed time expressed, for example, to five decimal places, with the only requirement being that the output conform to a time corresponding to the longest course which is anticipated as being traveled by the bicycle during an operation such as a race or the like in connection with the information desired.

A third memory circuit means M3 of the computer means is capable of receiving from the divider K1 the pulses $i'$, which are a measure of the distance traveled, this memory means M3 starting its operation at a predetermined instant and continuing up to the time when a predetermined number of pulses have been provided or after a predetermined interval has elapsed, this memory circuit M3 being controlled by a manually operable electrical circuit or connecting means $\phi$ which is itself controlled by manually operable elements of the units C and D. These manually operable elements are in the form of simple switches which are manually operated. As a result, this circuit M3 is used for measuring any part of an entire course with the result capable of being expressed in hundredths of a kilometer with two decimals, the length or final duration of such a course being capable of being determined in advance.

A fourth memory circuit M4 and an associated arithmetic logic circuit L1 are utilized to measure the speed at any given instant. Such arithmetic logic circuits are well known in conventional pocket calculators. The logic circuit L1 is coupled by way of the operator $\phi$ to the output of an AND gate P which receives on the one hand the timed signal pulses $j$ and on the other hand a signal from a conditioning circuit Q such as a one shot multivibrator which is controlled by the pulses $i$ derived from the means G. The conditioning circuit Q may be a D-type flip-flop such as a CD4013AE integrated circuit. Thus, the logic circuit L1 receives a series of timed signals, the number of which corresponds to the duration required for a single revolution of the wheel 11, and as a result it is possible for the logic circuit L1 to transmit to the memory means M4 an indication of the instantaneous speed attained by the bicycle at any given instant. This value can be expressed in the form of tens of kilometers per hour with two or three decimals, the only requirement being that the frequency of the timed signals from the means H be sufficiently great so that there will be at least a hundred signal pulses for each wheel revolution when traveling at the greatest speed.

The computer means MP also includes a fifth memory means M5 and an arithmetic logic circuit L2 associated therewith for the purpose of providing an output indicative of the average speed of the bicycle. The logic circuit L2 can be of a type which totalizes incremental values and in the illustrated example is simply coupled to the circuit L1 under the control of the operator $\phi$ but this logic circuit L2 could equally well be connected, as shown by dotted lines, independently of the logic circuit L1 to receive by way of the same operator $\phi$ on the one hand the distance pulses $i'$ and on the other hand the timed signals $j'$. In either of these cases the logic circuit L2 is thus capable of operating to supply to the memory register M5 a value according to the average speed achieved during any predetermined part of a given course of travel with the operator $\phi$ being under the control of manually operable selecting elements of the assembly C and D. This latter value achieved by way of the memory means M5 can be expressed in the same way as the preceding values, in tens of kilometers per hour up to two or three decimal places. In addition, an incremental calculator and an associated unillustrated memory register can be coupled to the circuits to enable values according to maximum speed or peak sprint speeds to be achieved.

All of the several memory circuits M1-M5 can take the form of suitable counters utilizing a CD4029AE integrated circuit suitably connected so as to perform an up-counting operation.

As is apparent from the above description, the memory registers M1 and M2 store in a permanent manner, respectively, a measurement according to the total distance traveled and a measurement according to the elapsed time (or at least the time which has elapsed from the start of the operation such as, for example, from the start of a given part of a course of travel). The register M4 can of course contain at any given instant a measure of the instantaneous speed. Finally, the memory registers M3 and M5 contain, at any instant during travel along part of a given course from a given starting location and having a predetermined distance and/or duration, measurements respectively of the length of the ride and the average speed from the beginning of the course.

Moreover, as already indicated, it is sufficient to add to the circuits described and shown any other simple components for receiving and registering any corresponding values which are to be additionally furnished as judged to be useful, such as, for example, peak speed, rate of pedal operation, and heart rate of the cyclist. In this latter connection there is schematically shown in FIG. 1 an assembly of electrodes 40 capable of being placed on the body of the operator at the region of the heart for providing through the conductor 42 a signal according to the heart rate, the input from the conductor 42 being supplied to the computer means MP as illustrated schematically in FIG. 2, and suitable units as described above being provided for indicating values according to the heart rate of the operator. Also as is shown schematically in FIG. 1, the rotary pedal assembly can carry a means A' corresponding to the means A of FIG. 1, this means A' turning with the pedals and moving past a means B' corresponding to the means B and producing in the same way in response to the movement of the means A' a signal such as the signal $i$ and utilized in a manner described above for indicating the rate at which the pedals are operated, the means B' being carried by a suitable part of the frame 16 as illustrated in FIG. 1.

The above values are advantageously memorized, for example, in binary form, all in the same format and displayed in an illuminated manner by the same number of decimals, for example up to five decimals as already indicated. Under these conditions the selective display of these values can be provided by way of a single indicating assembly which includes for example, and as shown, on the one hand a selecting and numerical decoding circuit N incorporated into the computer means MP and also controlled by the units C and D, while on the other hand a display register R(V) is provided at the exterior of the computer means and advantageously taking the form of a display device which has either light-emitting or liquid-crystal diodes and which has a supplemental location for a symbol S identifying the particular value which is displayed. Moreover and indicating lamp T can be provided to signal particularly the end of a given part of a course the length or duration of which has been preliminarily determined. The decoding circuit N may be in the form of a suitable display driver such as a CD4055AE integrated circuit, the output of which actuates the well known light-emitting or liquid-crystal diodes of the display register R(V).

The computer MP and the display devices RV, T are supplied with power from separate and distinct electrical energy sources such as, for example, a battery U for the computer means and a miniature battery U' for the display devices, or a dynamo may be mounted on the bicycle for this purpose. These arrangements are provided in view of the different types of energy consumption of the different types of apparatus, and also in view of the necessity of retaining certain registered information and ultimately the operation of the means H, in the event of prolonged non-use of the bicycle. In this connection it can be advantageous to substitute or to associate an electro-mechanical totalizer or a magnetic micro-memory means to those registers, such as M1, which contain information which should be retained in the event that there is an interruption in the source of power to the computer means MP. Moreover, it may be of interest to replace or control the means H for providing the timed signals by way of an independent electric or electronic watch or other timepiece, mounted directly on the bicycle to indicate the time of day as well as to provide reference timing signals at predetermined intervals to a simple oscillator incorporated in the computer MP.

Of course, the connection of the computer as well as the number and operations of its circuits can be modified in any desired manner according to the range of desired measurements and the selection of the manner of display thereof.

FIGS. 3 and 4 respectively illustrate two examples of the control and the display assemblies C and the starting and stopping components D, compatible with a computer means as described above.

FIG. 3 shows schematically how the computer means MP can conveniently be mounted in the left part of the handlebar 13, in the interior thereof, while the energy sources can conveniently be mounted in the right part of the handlebar, in the example illustrated in FIG. 3. The assembly C is shown in FIG. 3 as it appears from above when viewed by the operator of the bicycle. This assembly C is essentially constituted by way of a sleeve 20 of as small a diameter as possible compatible with the mounting of this sleeve around the central portion of the handlebar 13 with part of the sleeve 20 also being mounted at the handlebar stem 14, so that in fact the sleeve 20 must be constituted by at least two pieces. The sleeve 20 is provided at the central part of its visible portion with a window 21 which enables the operator to view numerals and symbols S displayed by the register R. This display can take the form, for example, of six light-emitting diodes arranged in segments as illustrated. Just below the register R there is situated the light-emitting bar 22 forming the indicating lamp T, which, for example, is capable of providing a blinking type of signal at the end of a given course of travel or of the lapse of a predetermined interval, with the illuminated indicator T being capable of remaining permanently illuminated in the event that the sources of energy should become inadequate to provide the required power. Finally, the opposed ends of the sleeve 20 carry rotary rings 23 and 24, the diameter of which is just adequate to enable these rings to be placed around the handlebar 13.

The ring 23 forms a display selector having three stable positions 0, 1 and $\infty$, respectively permitting the register R to terminate its operation with a view to conserving energy, enabling an instantaneous display of a value selected from a different location, or providing a permanent display of a predetermined value.

Moreover, there are a pair of transient positions, for example at the end of a race course, permitting the display of the total distance traveled and the time of day, assuming there is room.

The right ring 24 forms a value selector, which enables a preliminary determination of the distance or duration of a given part of a course to be provided, expressed in appropriate units by numerals selected in a suitable scale range. An additional position ∞ provides for a selection of values with respect to a course of travel from a predetermined starting point but having a length and duration which preliminarily are without limit. For the purpose of clarity of the drawing, the indicated numbers have been provided on the sleeve 20. In practice, it will be better to provide these numbers on the ring 24 so that the numbers then can be lined up with a given index on the visible portion of the sleeve, this index being in alignment with the register R.

The manually operable release components D are arranged in two groups D' and D" respectively carried by the brackets 17 for the brake-operating elements at the left and right parts of the handlebar, to provide different measurements pertaining on the one hand to the actual course traveled such as a race course, and on the other hand to preliminary or momentary tests. Thus, the test controls are shown at the right in FIG. 3 while the actual course controls are shown at the left. Each group includes three pushbuttons situated at the outer sides of the brackets 17 with the left three pushbuttons providing respectively controls for the values of distance P, speed V, and time T, while the right controls provide the values for distance $p$, speed $v$, and time $t$, under test operating conditions.

The left group of the controls D' in FIG. 3 relating to the actual course, in addition include a pushbutton RAZ for starting a measurement, this latter pushbutton being situated beneath the left bracket 17 or at any location which is not easily accessible and which is capable of minimizing unintentional actuation. The operation of this pushbutton serves to zero the registration of the duration and length of the partial course of travel, provided by the registers M2 and M3 and also to zero the average speed register M5 of the computer means. If one of the lateral buttons shown at the left in FIG. 3 is simultaneously actuated, the number displayed by the ring 24 is taken into account in order to determine the length or duration of the course which is about to be traveled. If finally only one lateral button is operated, the corresponding value is displayed by the register R either momentarily or until the next selection is made in accordance with the position of the ring 23.

The controls D' in connection with the test operation includes an additional control button A/M having two positions respectively providing for automatic or manual control of the end of the test, in the first case upon issue of a preliminarily programmed course or time interval, and in the second case upon release of the particular button which has been operated. In both cases the pushing of a lateral button controls not only the start of a measurement of distance traveled, time or instantaneous speed, but also the display of this value by the register R up till the instant of release of the button. In the event that automatic control of the end is provided, this display can be voluntarily completed by again pressing the button.

FIG. 4 illustrates a variation according to which the unit C of FIG. 3 is replaced by a unit C' mounted on the front part of the upper frame bar 15 of the bicycle and including a keyboard 30 for selection of the type of display and of the value either of distance or time. With respect to this latter point, there can advantageously be provided an automatic addition of the successively operated numbers of the keyboard so as to program in this way the entire distance or time. Moreover, the keyboard 30 enables a combination of control functions to be provided. To illustrate this possibility, the control of the actual course traveled and of the test need only include a single lateral button, as illustrated in FIG. 4.

This particular embodiment lends itself particularly well, at the cost of utilizing a memory device of sufficient capacity, to programming of a course of travel, with automatic instantaneous repetition of the extent of advance or lag with respect to a schedule of operation programmed before starting, and/or with registration of the actual performance on the course of travel, with a view to analysis of the registered values at the end of the course of travel.

Of course, the invention is not limited only to the particular examples described and illustrated but on the contrary can be formed by any means which are equivalent to those indicated above, taken separately or in combination and embodied in the scope of the claims which follow.

What is claimed is:

1. The combination of a bicycle and an information-producing assembly carried thereby, comprising a pair of means cooperating with each other for producing electrical revolution signals, said bicycle including a wheel carrying one of said pair of means for rotation with said wheel and a part carrying the other of said pair of means at a location for responding to turning of said one of said pair of means past the other of said pair of means for providing a revolution signal at each revolution of said wheel which carries said one of said pair of means, computer means carried by another part of the bicycle and electrically connected with the other of said pair of means for receiving said revolution signals therefrom, timed signal-producing means for producing timed electrical signals at a given frequency, said timed signal-producing means being electrically connected with said computer means for transmitting said timed signals thereto, said computer means having logic and arithmetic circuits for carrying out operations such as conditioning, calculating, treating, and memorizing, to produce from said revolution signals and timed signals a lasting value of distance traveled and ultimately of time elapsed during travel of the bicycle along a given course, and for also producing at the option of the operator values in connection with part of a course which is traveled by the bicycle, such as distance or time, average speed, maximum speed, and instantaneous speed attained at any given instant, indicating means operatively connected with said computer means for indicating at the selection of the operator time or distance in connection with part of the traveled course, and in a temporary illuminated display any of the above other values, and a source of electrical energy operatively connected with said pair of means, said computer means, and said indicating means for operating the same at least during use of the bicycle.

2. The combination of claim 1 and wherein said one of said pair of means is a magnetic means carried by said bicycle wheel while the other of said pair of means is a pick-up means responding to each passage of said one of said pair of means past said other means.

3. The combination of claim 2 and wherein said wheel has a pneumatic valve and said one of said pair of means is in the form of a magnetic body carried by said wheel at an inner part of a rim thereof diametrically opposed to said valve for contributing to the balance of said wheel.

4. The combination of claim 1 and wherein said timed signal-producing means produces said timed signals at a frequency at least on the order of kilohertz and said computer means includes a circuit for counting the number of timed signals produced during each wheel revolution, said frequency of said timed signal-producing means being sufficiently great to provide for each wheel revolution at maximum speed at least a hundred timed signals.

5. The combination of claim 1 and wherein said computer means includes, for measuring the total distance traveled, at least a circuit for counting the revolution signals supplied by the other of said pair of means and an associated memory circuit, capable of retaining the memorized values in the event that the supply of energy is interrupted.

6. The combination of claim 1 and wherein said computer means includes, for measuring average speed and peak sprint speed, at least one arithmetic circuit coupled to circuits for performing calculations from said signals, and a memory circuit associated with said arithmetic circuit for registering said calculations.

7. The combination of claim 1 and wherein said computer means includes, for purposes such as measuring partial distances and times and average or peak speeds, at least a circuit for detecting the end of the measurement and a signal means associated therewith.

8. The combination of claim 1 and wherein said computer means includes a manually operable selecting means for starting and zeroing the measurement of partial distance or time or average or peak speeds, and a second manually operable means for selectively displaying the results of any of said measurements.

9. The combination of claim 8 and wherein said display means comprises a single display area including indicating elements such as diodes, and capable of selectively displaying the measurement results numerically in the form of digits at least up to four places, and including also identifying symbols for identifying the measurement which is displayed and the units thereof.

10. The combination of claim 1 and wherein the bicycle includes part such as a handlebar, a handlebar stem, and brackets carrying brake handles, and said indicating means being mounted at least at some of the latter parts of the bicycle.

11. The combination of claim 1 and wherein a means is operatively connected with said computer means for indicating therethrough additional values.

* * * * *